US007242961B2

(12) United States Patent
Hansen

(10) Patent No.: US 7,242,961 B2
(45) Date of Patent: Jul. 10, 2007

(54) CHANNEL RECIPROCITY MATRIX DETERMINATION IN A WIRELESS MIMO COMMUNICATION SYSTEM

(75) Inventor: Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 10 days.

(21) Appl. No.: 11/209,003

(22) Filed: Aug. 22, 2005

(65) Prior Publication Data

US 2007/0015526 A1 Jan. 18, 2007

Related U.S. Application Data

(60) Provisional application No. 60/698,691, filed on Jul. 13, 2005.

(51) Int. Cl.
*H04M 1/00* (2006.01)
(52) U.S. Cl. ............... 455/552.1; 455/553.1; 455/101; 455/103; 455/132; 370/319; 370/320; 370/321
(58) Field of Classification Search ............. None
See application file for complete search history.

(56) References Cited

U.S. PATENT DOCUMENTS 7,110,349 B2 * 9/2006 Branlund et al. ........... 370/203

| 7,113,540 B2 * | 9/2006 | Yousef et al. | 375/233 |
| 2004/0095907 A1 * | 5/2004 | Agee et al. | 370/334 |
| 2004/0132416 A1 * | 7/2004 | Yee | 455/82 |
| 2004/0146018 A1 * | 7/2004 | Walton et al. | 370/329 |
| 2005/0227628 A1 * | 10/2005 | Inanoglu | 455/68 |
| 2006/0056522 A1 * | 3/2006 | Tsatsanis et al. | 375/257 |
| 2006/0072683 A1 * | 4/2006 | Kent et al. | 375/267 |
| 2006/0159160 A1 * | 7/2006 | Kim et al. | 375/148 |

* cited by examiner

*Primary Examiner*—Steve M. D'Agosta
(74) *Attorney, Agent, or Firm*—Garlick Harrison & Markison; Bruce E. Garlick

(57) ABSTRACT

Operating a wireless MIMO system to determine forward and reverse channel reciprocity matrices relating a first wireless MIMO device and a second wireless MIMO device of the wireless MIMO system includes, during each of a plurality of time intervals, determining a forward composite channel estimates and a reverse composite channel estimates between the first wireless MIMO device and the second wireless MIMO device to yield a plurality of forward composite channel estimates and a plurality of reverse composite channel estimates. Operation continues with creating a mathematical relationship between the plurality of forward composite channel estimates and the plurality of reverse composite channel estimates and the forward and reverse channel reciprocity matrices. Operation concludes with finding a solution to the mathematical relationship between the plurality of forward composite channel estimates and the plurality of reverse composite channel estimates to yield the forward reciprocity matrix and the reverse channel reciprocity matrix.

20 Claims, 9 Drawing Sheets

CHANNEL RECIPROCITY MATRIX DETERMINATION IN A WIRELESS MIMO COMMUNICATION SYSTEM

CROSS REFERENCE TO RELATED APPLICATION

This application claims priority to U.S. Provisional Patent Application Ser. No. 60/698,691, filed Jul. 13, 2005, which is incorporated herein by reference for all purposes.

BACKGROUND OF THE INVENTION

1. Technical Field of the Invention

This invention relates generally to wireless communication systems and more particularly to channel equalization in wireless Multi-Input-Multi-Output (MIMO) communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter includes one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11 g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-multiple-output (MIMO) wireless communication, the transmitter and receiver each include multiple paths. In such a MIMO communication system, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed in an attempt to recover the original data.

To improve wireless communications, transceivers typically incorporate channel equalization operations. In order for a transceiver to properly implement channel equalization upon a received signal, it must determine the properties of the channel over which the wireless communication is conveyed. One approach to do this is for each transceiver to determine the channel response from its own perspective, e.g., based upon received data. In such case, each of a pair of transceivers that exchange data must determine its channel response and then select channel equalizer settings upon the channel response. Determination of the channel response can be a complicated and drawn out procedure, consuming battery life and diverting the operation of the transceiver from its data transfer operations.

One technique that has been proposed to reduce resource usage for channel estimation is to use a channel response determined by a first transceiver of the transceiver pair for channel equalization of the second transceiver of the transceiver pair. Thus, for example, if a mobile station (STA) is in communication with an access point (AP), the AP could theoretically estimate the channel between itself and the STA and pass the estimated channel parameters to the STA for use. Heretofore, such operation has not been possible because of the unique and differing RF characteristics of the STA and the AP. For example, each of the STA and the AP have differing antenna structures, differing RF signal processing characteristics, and differing other operational characteristics. These differences precluded the use of one channel estimate by both the STA and the AP, or by any other wireless devices. Thus, a need exists so that a single channel estimate may be used by both of the wireless devices.

BRIEF SUMMARY OF THE INVENTION

The present invention is directed to apparatus and methods of operation that are further described in the following Brief Description of the Several View of the Drawings, the Detailed Description of the Invention, and the Claims. Features and advantages of the present invention will become apparent from the following description made with reference to the accompanying drawings.

DETAILED DESCRIPTION OF THE INVENTION

Figure 1:
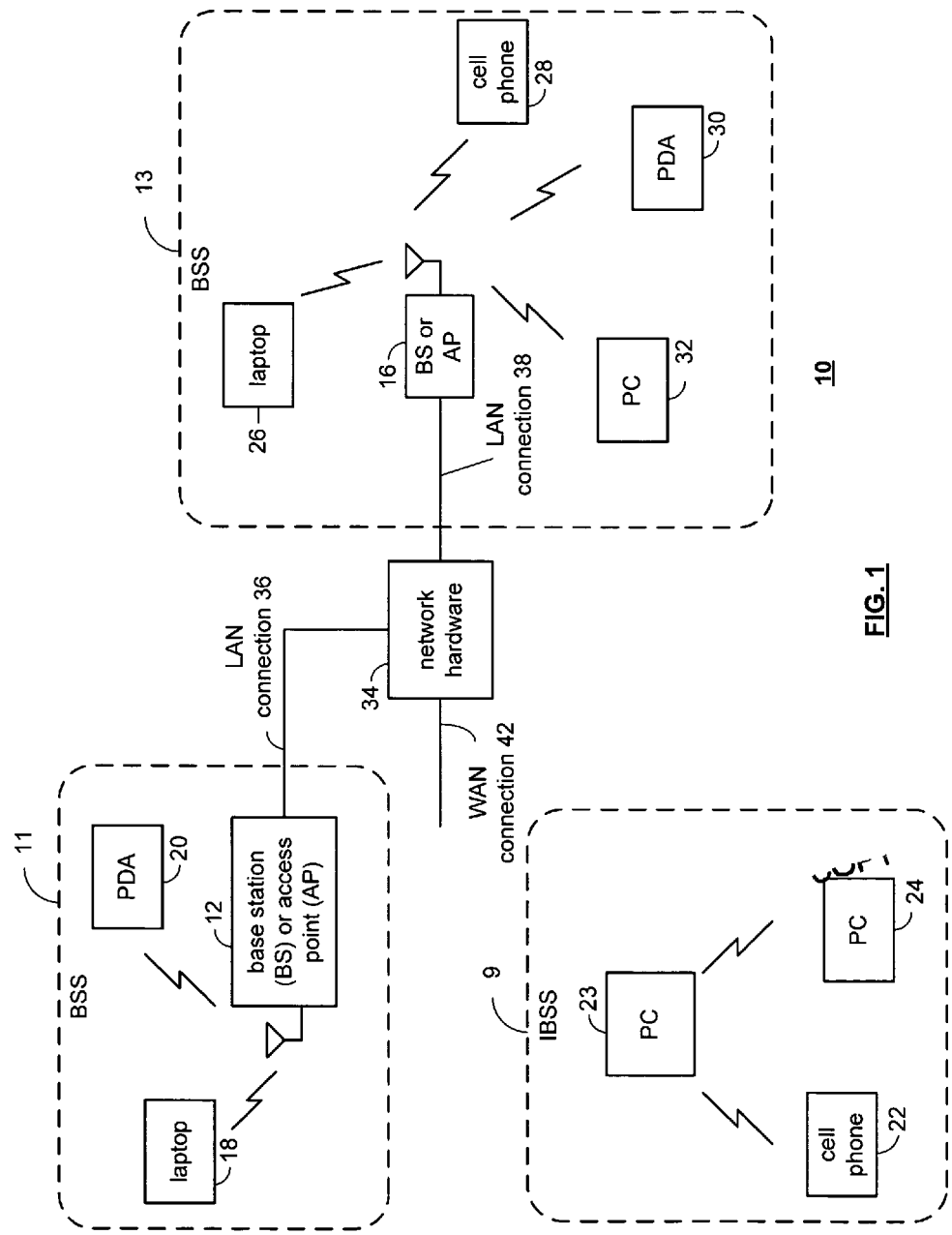
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32, and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
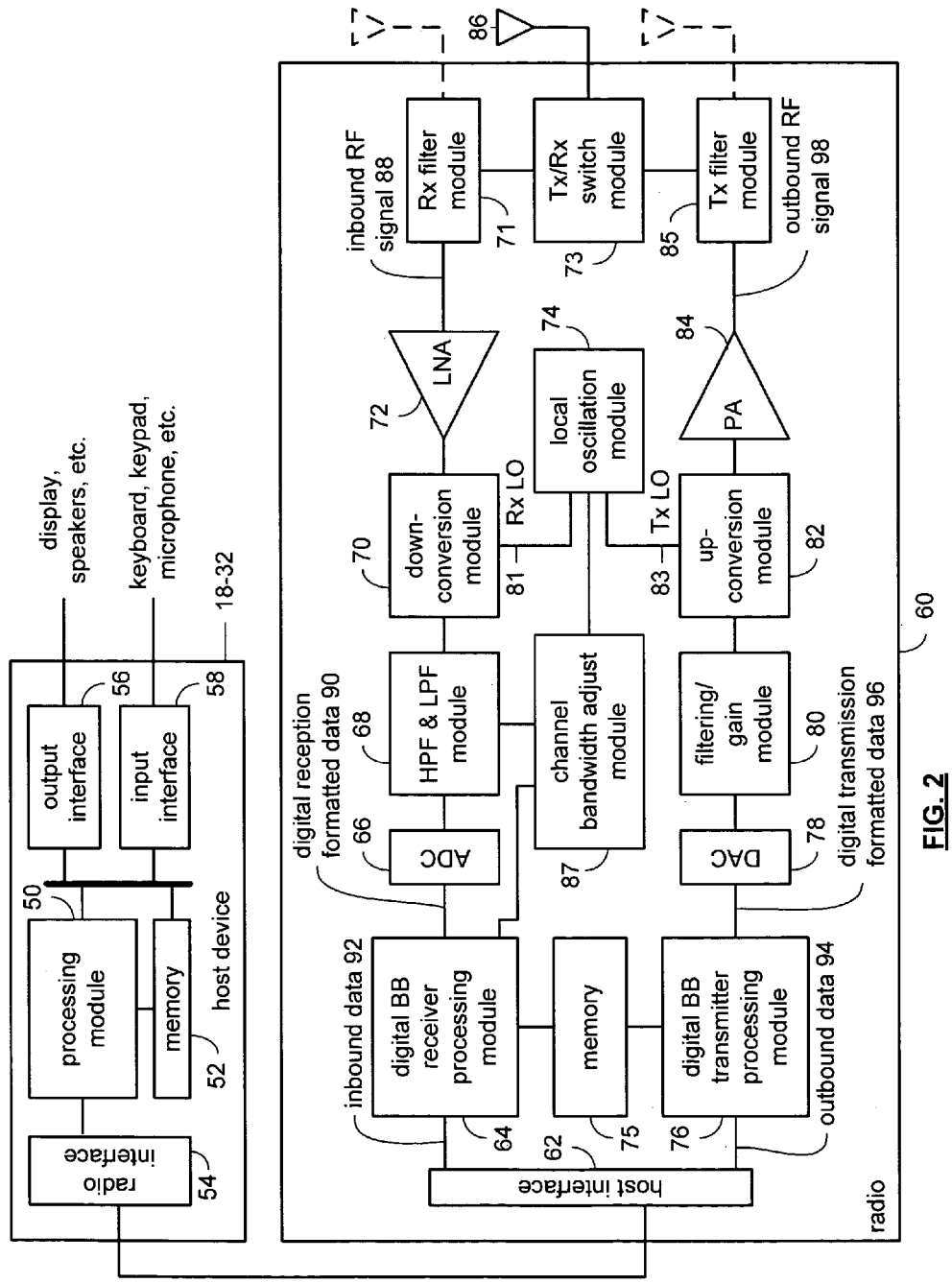
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point, and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 band pass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
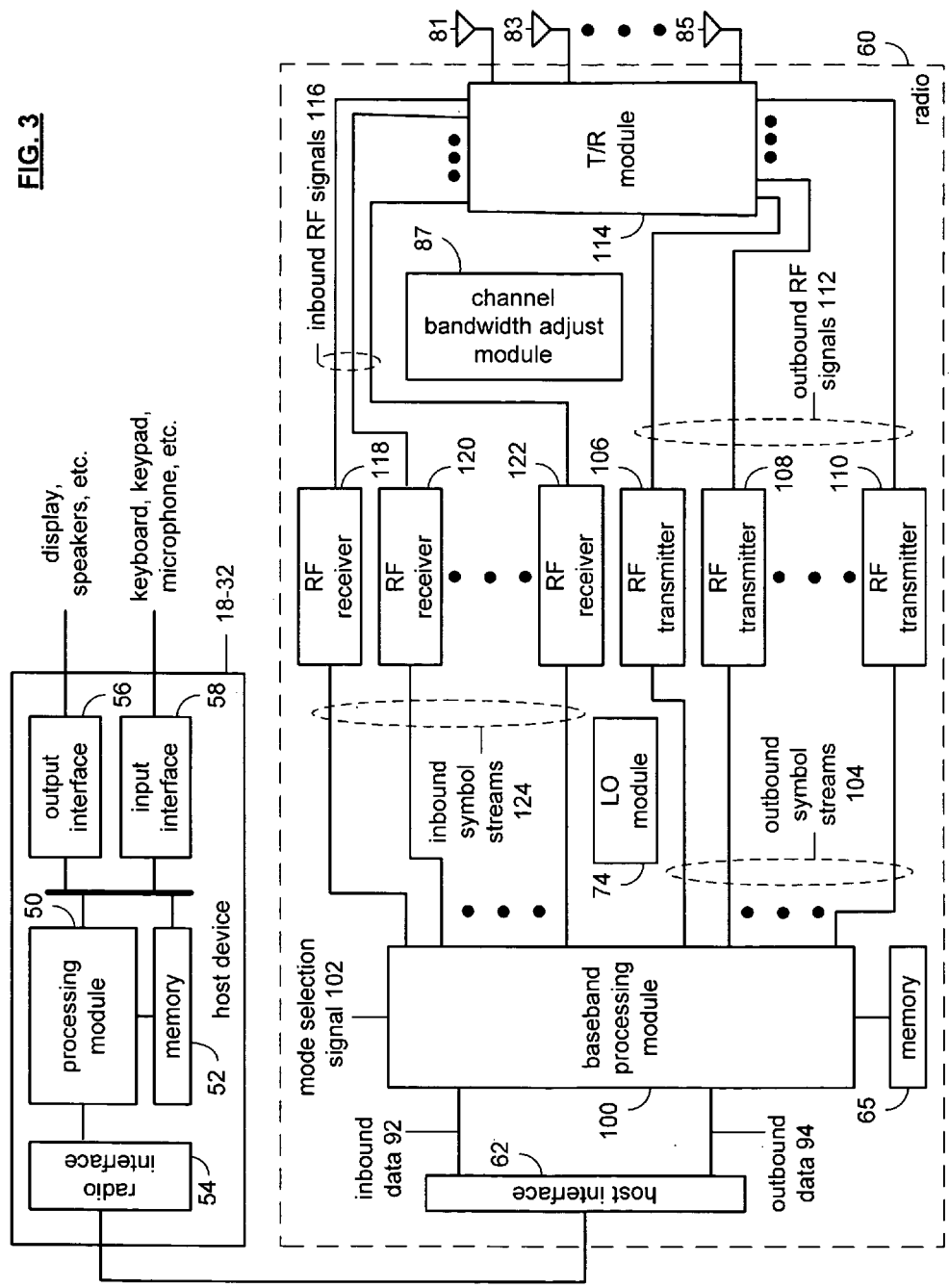
FIG. 3 is a schematic block diagram of another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM, and/or 64 QAM. The mode select signal 102 may also include a code rate, a number of coded bits per sub carrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3, or 4 antennas, the baseband processing module 100 will produce 2, 3, or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and up sampling module, a digital to analog conversion module, an analog filter module, a frequency up conversion module, a power amplifier, and a radio frequency band pass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4A:
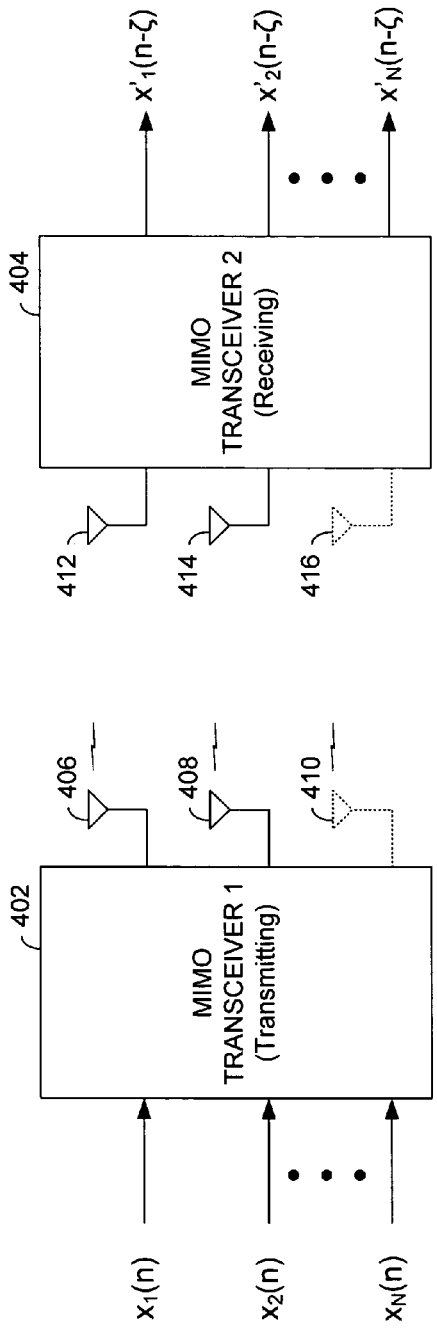
FIG. 4A is a schematic block diagram of a MIMO wireless communication system supporting a plurality of, e.g., P, an integer between two and N, data streams.

FIG. 4A is a schematic block diagram of a MIMO wireless communication system supporting a plurality of, e.g., P, an integer between two and N, data streams. With the embodiment of FIG. 4A, a first MIMO transceiver 402 is in a transmit mode while a second MIMO transceiver 404 is in a receive mode, receiving the data streams from the first MIMO transceiver 402. The first MIMO transceiver 402 includes P antennas 406-410 corresponding to the P transmit streams. Further, the second MIMO transceiver 404 includes P antennas 412-416. This type of system may be referred to generally as an N×N MIMO system. As the reader will appreciate, the number of antennas and data streams may differ in various embodiments.

The data streams transmitted by the first MIMO transceiver 402 are referred to as $X_i(n)$, where i references the particular data stream. The data streams received by the second MIMO transceiver 404 are referred to as $X'_i(n-\zeta)$ to represent the action of the RF transmitter components of the first MIMO transceiver 402 on the data streams, the shift in time due to the channel delay of the data streams, the action of the channel on the data streams, and of the action of the RF receiver of the second MIMO transceiver 404 on the data streams. The reader will appreciate that the signals $X_i(n)$ refer to baseband or low IF symbol streams, i.e., outbound symbol streams 104 of MIMO transceiver 402, while the signals $X'_i(n-\zeta)$ refer to baseband or low IF symbol streams, i.e., inbound symbol streams 124 of MIMO transceiver 404.

Figure 4B:
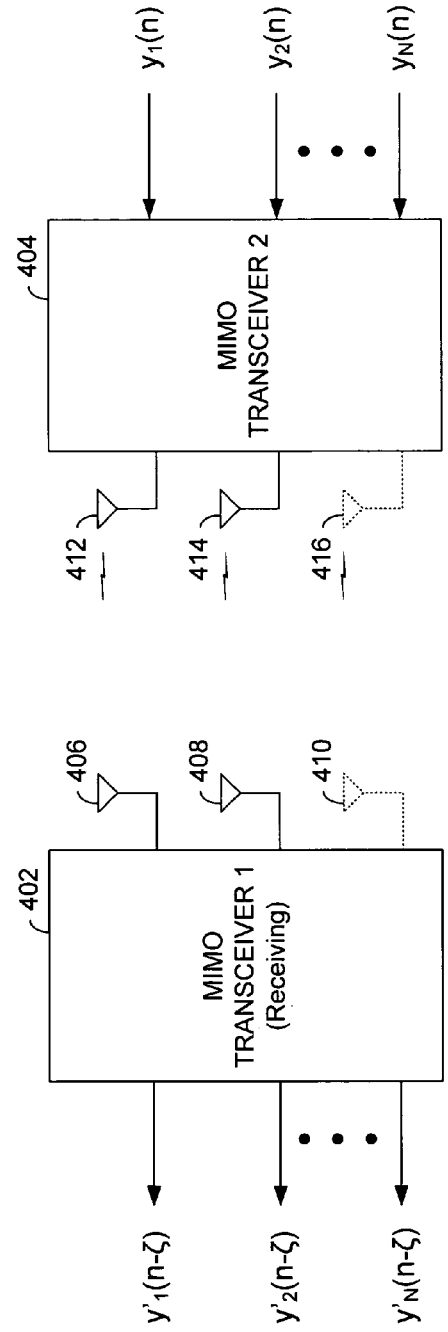
FIG. 4B is a schematic block diagram of the MIMO wireless communication system of FIG. 4A in a different operating mode.

FIG. 4B is a schematic block diagram of the MIMO wireless communication system of FIG. 4A in a different operating mode. With the embodiment of FIG. 4B, the second MIMO transceiver 404 is in a transmit mode while the first MIMO transceiver 402 is in a receive mode, receiving the data streams from the second MIMO transceiver 404. The data streams transmitted by the second MIMO transceiver 404 are referred to as $Y_i(n)$, where i references the particular data stream. The data streams received by the first MIMO transceiver 402 are referred to as $Y'_i(n-\zeta)$ to represent the action of the RF transmitter components of the second MIMO transceiver 404 on the data streams, the shift in time due to the channel delay of the data streams, the action of the channel on the data streams, and of the action of the RF receiver of the first MIMO transceiver 402 on the data streams. The reader will appreciate that the signals $Y_i(n)$ refer to baseband or low IF symbol streams, i.e., outbound symbol streams 104 of MIMO transceiver 404, while the signals $Y'_i(n-\zeta)$ refer to baseband or low IF symbol streams, i.e., inbound symbol streams 124 of MIMO transceiver 402.

Figure 5A:
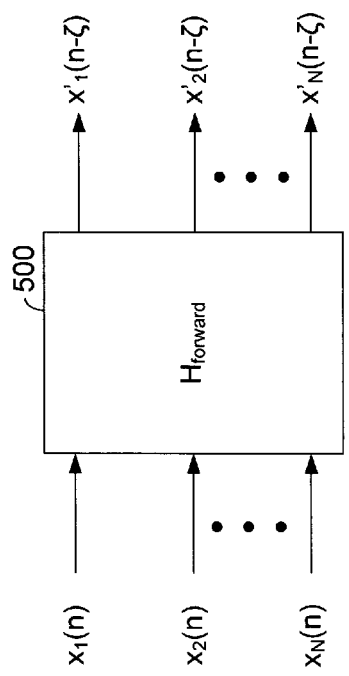
FIG. 5A is a block diagram representing the operation on the data streams of the overall transceiver system of FIG. 4A.
Figure 5B:
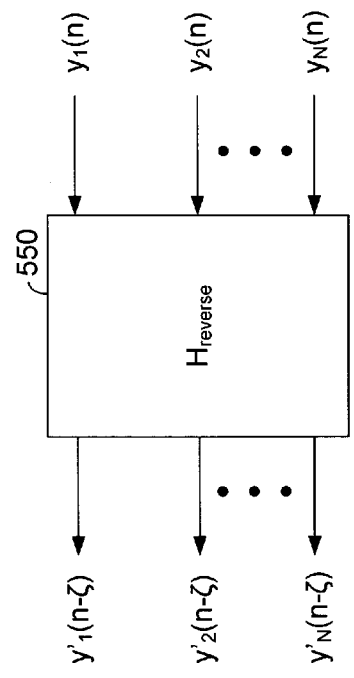
FIG. 5B is a block diagram representing the operation on the data streams of the overall transceiver system of FIG. 4B.

FIG. 5A is a block diagram representing the operation on the data streams of the overall transceiver system of FIG. 4A. FIG. 5B is a block diagram representing the operation on the data streams of the overall transceiver system of FIG. 4B. In these two figures, the forward and reverse transmit paths are represented as N×N port transfer functions. These N×N port models are extremely useful in characterizing and modeling the behavior of the wireless MIMO system. This concept may be extended for M port×N port transfer functions as well. As was the case with FIG. 4A, the signals $X_i(n)$ refer to baseband or low IF symbol streams, i.e., outbound symbol streams 104 of MIMO transceiver 402, while the signals $X'_i(n-\zeta)$ refer to baseband or low IF symbol streams, i.e., inbound symbol streams 124 of MIMO transceiver 404. Further, as was the case with FIG. 4B, the signals $Y_i(n)$ refer to baseband or low IF symbol streams, i.e., outbound symbol streams 104 of MIMO transceiver 404, while the signals $Y'_i(n-\zeta)$ refer to baseband or low IF symbol streams, i.e., inbound symbol streams 124 of MIMO transceiver 402.

According to the present invention, a technique is employed with which the channels $H_{forward}$ 500 ("forward composite channel") and $H_{reverse}$ 550 ("reverse composite channel") may be related to one another in a reciprocal manner so that only one of the first MIMO transceiver 402 and the second MIMO transceiver 404 is required to estimate the channel between the transceivers 402 and 404. The measuring MIMO transceiver may then transfer the channel estimate to the other MIMO transceiver, which employs the reciprocal nature of the channel to determine its own channel equalizer settings. This technique is described further with reference to FIGS. 6A through 9. With this technique, calibration matrices are determined that allow reciprocity to be applied to an N×N MIMO system.

Figure 6A:
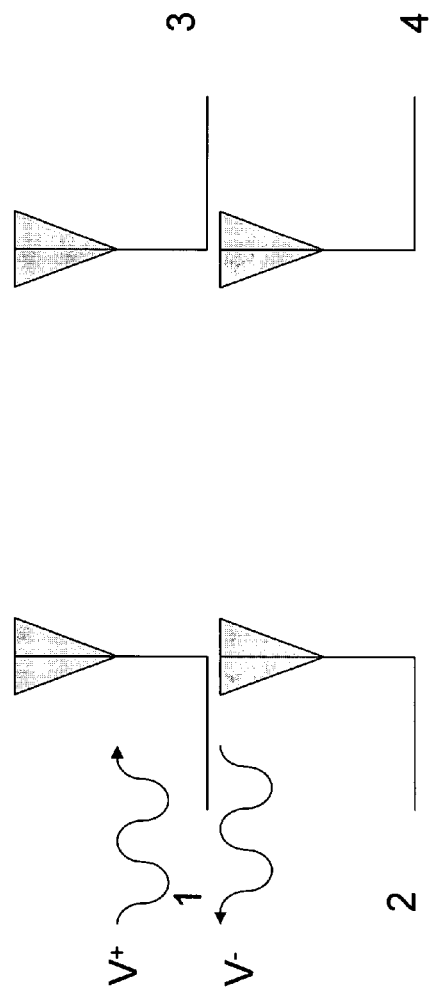
FIG. 6A is a block diagram representing a simplified 2×2 wireless MIMO system.
Figure 6B:
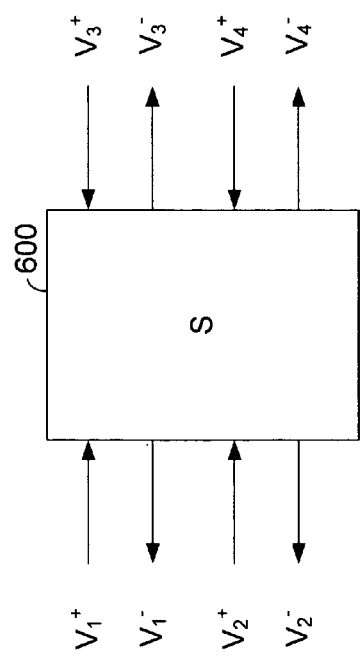
FIG. 6B is a block diagram illustrating the port equivalent of the 2×2 wireless MIMO system, having separate input and output paths at each of the four ports.

FIG. 6A is a block diagram representing a simplified 2×2 wireless MIMO system. FIG. 6B is a block diagram illustrating the port equivalent of the 2×2 wireless MIMO system, having separate input and output paths at each of the four ports. With this representation, transmitted signals are represented with a + superscript, e.g., $V_1^+$, $V_2^+$, $V_3^+$, and $V_4^+$ while received signals are represented with a + superscript, e.g., $V_1^-$, $V_2^-$, $V_3^-$, and $V_4^-$.

This system may be modeled as a reciprocal transfer model or a non-reciprocal channel model. While some elements of this transfer model may fairly be represented as being reciprocal, e.g., the channel model alone, mismatches exist in the actual system that causes the system to be non-reciprocal. These mismatches may be caused by antenna impedance mismatches, Tx power amplifier/switching component mismatches, and Rx low noise amplifier/switching component mismatches.

When this system is modeled, the following equation (1) may be established:

$$\begin{bmatrix} V_1^- \\ V_2^- \\ V_3^- \\ V_4^- \end{bmatrix} = \begin{bmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{bmatrix} \begin{bmatrix} V_1^+ \\ V_2^+ \\ V_3^+ \\ V_4^+ \end{bmatrix} \quad \text{(Eq. 1)}$$

When assuming that the channel is reciprocal, the following assumptions may be made (having the noted affect on the coefficients):

No reflections: Snn=0
No cross coupling: S21=S12=S34=S43=
Reciprocity: S13=S31=h11
   S23=S32=h12
   S14=S41=h21
   S24=S42=h22

With these assumptions, Equation 1 is simplified to produce Equation 2

$$S = \begin{bmatrix} 0 & 0 & h_{11} & h_{21} \\ 0 & 0 & h_{12} & h_{21} \\ h_{11} & h_{12} & 0 & 0 \\ h_{21} & h_{22} & 0 & 0 \end{bmatrix} \quad (\text{Eq. 2})$$

However, with these assumptions, the coupling between antenna elements reduces the accuracy of any calibration that may be determined. Such is the case because adjacent elements in some antenna arrays may have relatively tight coupling. For example, dipoles at half wavelength spacing have such characteristics (See Antennas, J. Kraus, Sec. 10-5). Alternatively, cross polarized antenna arrays may have little coupling. In any case, practical devices will have reflecting material in the near field which will cause antenna coupling, thereby causing the assumptions of Equation 2 to be incorrect. Further antennas may not have equal impedances. Practical antennas are not exactly 50 ohms. This is caused by the antenna design itself that limits bandwidth, cable and connector mismatch, and the presence of conductors in the near field. Further, Tx/Rx switches also typically have mismatches and Tx impedance often differs from Rx impedance. The net reflection coefficients resulting from mismatches can easily be in the −10 dB range.

Figure 7:
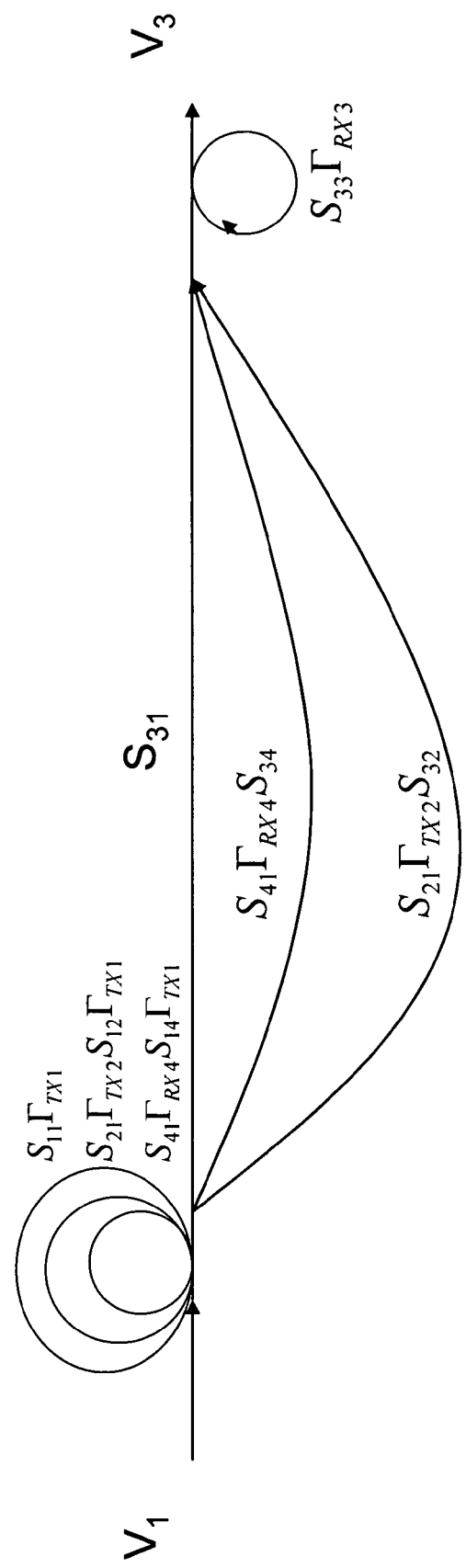
FIG. 7 is a diagram illustrating the components of a non-reciprocal transfer model.

FIG. 7 is a diagram illustrating the components of a non-reciprocal transfer model. Modeling only first order effects such as the mismatch differences between the Tx and Rx signal paths, a "diagonal" calibration of the transfer function may be sufficient. However, when the second order effects of cross coupling between channels is modeled, a "diagonal" calibration is no longer sufficient. The model of FIG. 7 may be characterized in part by Equations 3, 4, 5, and 6.

$$\hat{S}_{31} \approx \left[\frac{1}{1-S_{11}\Gamma_{TX1}}\right]\left[\frac{1}{1-S_{33}\Gamma_{RX3}}\right][S_{31} + S_{34}S_{41}\Gamma_{RX4} + S_{32}S_{21}\Gamma_{TX2}] \quad (\text{Eq. 3})$$

$$\hat{S}_{13} \approx \left[\frac{1}{1-S_{11}\Gamma_{RX1}}\right]\left[\frac{1}{1-S_{33}\Gamma_{TX3}}\right][S_{13} + S_{43}S_{14}\Gamma_{TX4} + S_{23}S_{12}\Gamma_{RX2}] \quad (\text{Eq. 4})$$

$$\hat{S}_{32} \approx \left[\frac{1}{1-S_{22}\Gamma_{TX2}}\right]\left[\frac{1}{1-S_{33}\Gamma_{RX3}}\right][S_{32} + S_{34}S_{42}\Gamma_{RX4} + S_{31}S_{12}\Gamma_{TX1}] \quad (\text{Eq. 5})$$

$$\hat{S}_{23} \approx \left[\frac{1}{1-S_{22}\Gamma_{RX2}}\right]\left[\frac{1}{1-S_{33}\Gamma_{TX3}}\right][S_{23} + S_{43}S_{24}\Gamma_{TX4} + S_{13}S_{21}\Gamma_{RX2}] \quad (\text{Eq. 6})$$

The channel modeling and reciprocity concepts identified with reference to FIG. 7 and the related text may be applied to the models of FIGS. 5A and 5B. With particular reference again to FIGS. 5A and 5B:

$H_{forward}$ 500 is the channel observed in the forward direction (i.e. at STA)

$H_{reverse}$ 550 is the reverse channel (seen at AP)

A matrices describe TX path

B matrices describe RX path

A and B are not directly observable

If A and B diagonal, C matrices can be computed such that calibrated channels are the transpose of one another (reciprocal).

Equations 7 through 12 describe the system of FIGS. 5A and 5B.

$$H_{forward} = B_2 H A_1 \quad (\text{Eq. 7})$$

$$H_{reverse} = B_1 H A_2 \quad (\text{Eq. 8})$$

$$H_{forward\_cal} = B_2 H A_1 C_1 = B_2 H B_1 \quad (\text{Eq. 9})$$

$$H_{reverse\_cal} = B_1 H^T A_2 C_2 = B_1 H^T B_2 \quad (\text{Eq. 10})$$

$$C_1 = \begin{bmatrix} 1 & 0 \\ 0 & \left(\frac{H_{forward\_11} H_{reverse\_21}}{H_{forward\_12} H_{reverse\_11}}\right) \end{bmatrix} \quad (\text{Eq. 11})$$

$$C_2 = \begin{bmatrix} 1 & 0 \\ 0 & \left(\frac{H_{reverse\_11} H_{forward\_21}}{H_{reverse\_12} H_{forward\_11}}\right) \end{bmatrix} \quad (\text{Eq. 12})$$

In order to be able to use reciprocity with respect to the time varying channel matrix H, the calibration matrices $C_1$ and $C_2$ must be determined. These calibration matrices: (1) Compensate for TX and RX path mismatches; (2) Require No direct knowledge of mismatches; and (3) Require simply one multiply per TX path.

Problems in determining $C_1$ and $C_2$ result because:

There is coupling between antenna elements, which reduce the accuracy of calibration;

A and B path matrices are non-diagonal;

Product of diagonal and cross coupling matrices;

No simple matrix structure of $C_1$ and $C_2$ results;

Cross coupling is different on Transmit and Receive paths;

Mismatch differences and coupling between antenna elements;

Full Calibration is still possible but more difficult; and

Requires multiple channel instantiations to compute $C_1$ and $C_2$.

As was the case with the diagonal calibration, $C_1$ and $C_2$ must be computed and B and A matrices are not directly observable. In order to compute $C_1$ and $C_2$, according to the present invention, multiple measurements of $H_{forward}$ 500 and $H_{reverse}$ 550 are employed. Each of these measurements of $H_{forward}$ 500 and $H_{reverse}$ 550 may be referred to as calibration measurements. Each of these calibration measurements represents the forward composite channel estimate/reverse composite channel estimate for a respective time. For these calibration operations, these composite channel estimates must be sufficiently independent to allow precise calibration computation of the calibration matrices.

$$H_{forward\_cal} = B_2 H A_1 C_1 = B_2 H B_1 \quad (\text{Eq. 13})$$

$$H_{reverse\_cal} = B_1 H^T A_2 C_2 = B_1 H^T B_2 \quad (\text{Eq. 14})$$

According to embodiments of the present invention, the Kronecker product can be used to compute $C_f$ and $C_r$ according to Equation 15.

$$Hf_n C_f = C_r^T Hr_n^T \qquad \text{(Eq. 15)}$$

Using this technique (as will be further described with reference to FIG. 8, operation requires measuring at least two, e.g., 3, instances of $H_{forward\_cal}$ ($H_f$) and $H_{reverse\_cal}$ ($H_r$). These values are then applied to equations 16 and 17.

$$(I \otimes Hf_n) vec(C_f) = (Hr_n \otimes I) vec(C_r) \qquad \text{(Eq. 16)}$$

$$\begin{bmatrix} I \otimes Hf_1 & -Hr_1 \otimes I \\ I \otimes Hf_2 & -Hr_2 \otimes I \\ I \otimes Hf_3 & -Hr_3 \otimes I \end{bmatrix} \begin{bmatrix} vec(C_f) \\ vec(C_r) \end{bmatrix} = 0 \qquad \text{(Eq. 17)}$$

The solution for the reciprocity matrices $C_f$ and $C_r$ is the single null vector of the matrix of Equation 17. Alternatively, the reciprocity matrices $C_f$ and $C_r$ may be computed using a Singular Value Decomposition (SVD) algorithm. Select column vector of V associated with smallest singular value.

$$[USV^H] = SVD\left(\begin{bmatrix} I \otimes Hf_1 & -Hr_1 \otimes I \\ I \otimes Hf_2 & -Hr_2 \otimes I \\ I \otimes Hf_3 & -Hr_3 \otimes I \end{bmatrix}\right) \qquad \text{(Eq. 18)}$$

Figure 8:
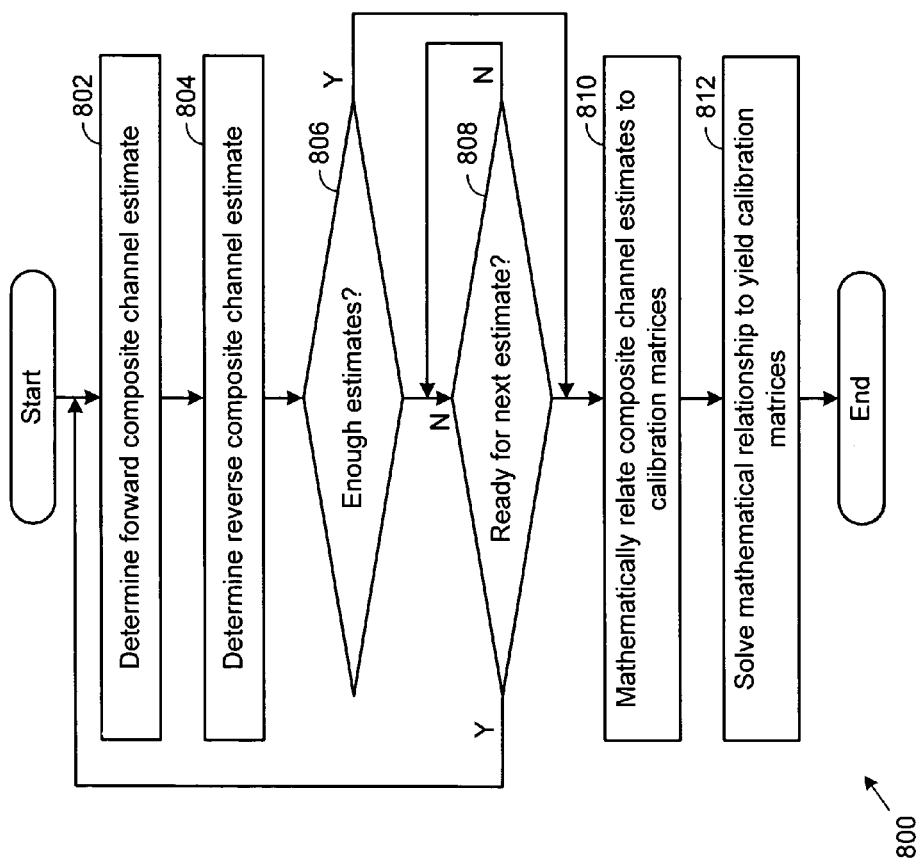
FIG. 8 is a flow chart illustrating one embodiment of the present invention for computing calibration matrices in a wireless MIMO system.

FIG. 8 is a flow chart illustrating one embodiment of the present invention for computing calibration matrices in a wireless MIMO system. Operation 800 commences with, during each of a plurality of time intervals, determining a forward composite channel estimate (step 802) and determining a reverse composite channel estimate (step 804) between a first wireless MIMO device and a second wireless MIMO device. A sufficient number of composite channel estimates must be determined so that a solution for the calibration matrices may be obtained, e.g., as was described previously with respect to Equations 7 through 18. According to one embodiment, at least three composite channel estimates are required to obtain a unique solution. However, with differing embodiments, as few as two or greater than three composite channel estimates are required to obtain a solution. When enough composite channel estimates have been obtained (as determined at step 806) operation proceeds to step 810. When enough composite channel estimates have not been obtained, operation proceeds to step 808.

At step 808, it is determined whether additional composite channel estimates may be determined. The operations of steps 802 and 804 are typically performed during differing time intervals so that the composite channel estimates are sufficiently independent to allow precise calibration computation of the calibration matrices. Thus, at step 808, a waiting period may be implemented to ensure that subsequent composite channel estimates are sufficiently independent from prior composite channel estimates. Alternately, composite channel estimates that are not sufficiently independent from other of the composite channel estimates are discarded.

With the operations of steps 802-808 completed, a plurality of forward composite channel estimates and a plurality of reverse composite channel estimates have been determined. Then, operation includes creating a mathematical relationship between the plurality of forward composite channel estimates and the plurality of reverse composite channel estimates and the forward and reverse channel reciprocity matrices (step 810). Finally, operation includes finding a solution to the mathematical relationship between the plurality of forward composite channel estimates and the plurality of reverse composite channel estimates to yield the forward reciprocity matrix and the reverse channel reciprocity matrix (step 812). These calibration matrices will be used as further described with reference to FIG. 9.

With one embodiment of the operations of steps 810 and 812, a Kronecker product may be used to find the solution to the mathematical relationship between the plurality of forward composite channel estimates and the plurality of reverse composite channel estimates to yield the forward reciprocity matrix and the reverse channel reciprocity matrix. With another embodiment of the operations of steps 810 and 812, a Singular Value Decomposition algorithm may be used to find the solution to the mathematical relationship between the plurality of forward composite channel estimates and the plurality of reverse composite channel estimates to yield the forward reciprocity matrix and the reverse channel reciprocity matrix.

With any of these techniques, for the solutions produced in some embodiments, each of the forward channel reciprocity matrix and the reverse channel reciprocity matrix are non-diagonal. Further, in some other embodiments, each of the forward channel reciprocity matrix and the reverse channel reciprocity matrix are non-symmetrical. The techniques of the present invention apply to any wireless MIMO system. Examples of such wireless MIMO system are N×M MIMO systems, where M is not equal to N and N×N MIMO systems.

Figure 9:
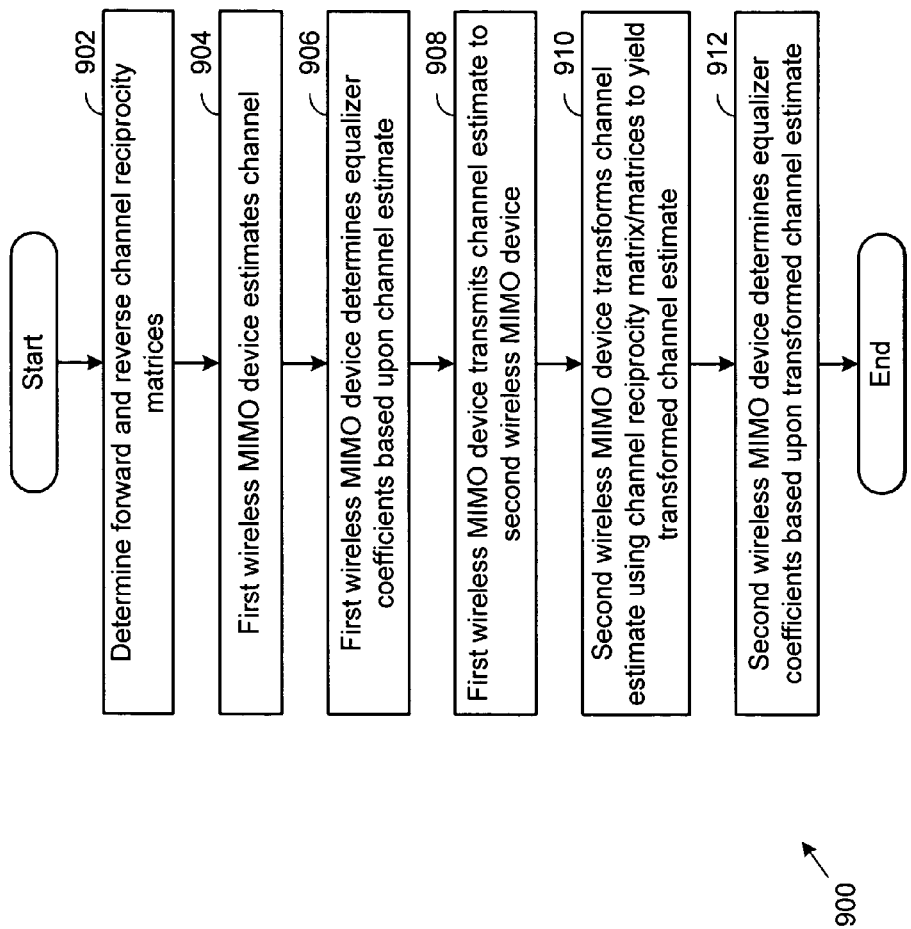
FIG. 9 is a flow chart illustrating one embodiment of the present invention for operating a wireless MIMO system.

FIG. 9 is a flow chart illustrating one embodiment of the present invention for operating a wireless MIMO system. The operation 900 of FIG. 9 relates directly to, and expand upon the operations of FIG. 8. Operation 900 commences with determining forward and reverse channel reciprocity matrices between a first wireless MIMO device and a second wireless MIMO device (step 902). The operations of step 902 correspond to the operations 800 of FIG. 8 in one embodiment. Operations continue with determining, by the first wireless MIMO device, a channel estimate (step 904). The first wireless MIMO device then uses the channel estimate to determine channel equalizer coefficients for the first wireless MIMO device (step 906);

The first wireless MIMO device then transmits the channel estimate to the second wireless MIMO device (step 908). The second wireless MIMO device uses at least one of the forward channel reciprocity matrix and the reverse channel reciprocity matrix to transform the channel estimate to a transformed channel estimate (step 910). Finally, the second wireless MIMO device uses the transformed channel estimate to determine channel equalizer coefficients for the second wireless MIMO device (step 912). With the operations 900 of FIG. 9, therefore, only one of the wireless MIMO devices must estimate the channel for any given exchange of digital information. The other wireless MIMO device of the pair of wireless MIMO devices passes the channel estimate to the other wireless MIMO device, which uses the channel estimate to prepare its own (transposed) channel estimate based upon the calibration matrices.

The preceding discussion has presented a method and apparatus for reducing feedback information for beamforming in a wireless communication by using polar coordinates. As one of average skill in the art will appreciate, other embodiments may be derived from the present teachings without deviating from the scope of the claims.

What is claimed is:

1. A method for operating a wireless MIMO system comprising:
   determining forward and reverse channel reciprocity matrices between a first wireless MIMO device and a second wireless MIMO device, comprising:
      determining a plurality of forward composite channel estimates and a plurality of reverse composite channel estimates between the first wireless MIMO device and the second wireless MIMO device; and
      using the plurality of toward composite channel estimates and the plurality of reverse composite channel estimates to yield the forward channel reciprocity matrix and the reverse channel reciprocity matrix, wherein each of the forward channel reciprocity matrix and the reverse channel reciprocity matrix are non-diagonal;
   determining, by the first wireless MIMO device, a channel estimate;
   using the channel estimate to determine channel equalizer coefficients for the first wireless MIMO device;
   transmitting the channel estimate from the first wireless MIMO device to the second wireless MIMO device;
   the second wireless MIMO device using at least one of the forward channel reciprocity matrix and the reverse channel reciprocity matrix to transform the channel estimate to a transformed channel estimate; and
   the second wireless MIMO device using the transformed channel estimate to determine channel equalizer coefficients for the second wireless MIMO device.

2. The method of claim 1, wherein a Kronecker product is used to compute the forward channel reciprocity matrix and the reverse channel reciprocity matrix based upon the plurality of forward composite channel estimates and the plurality of reverse composite channel estimates.

3. The method of claim 1, wherein a Singular Value Decomposition algorithm is used to compute the forward channel reciprocity matrix and the reverse channel reciprocity matrix based upon the plurality of forward composite channel estimates and the plurality of reverse composite channel estimates.

4. The method of claim 1, wherein each of the forward channel reciprocity matrix and the reverse channel reciprocity matrix are non-symmetrical.

5. The method of claim 1, wherein the wireless MIMO system is an N×M MIMO system, where M is not equal to N.

6. The method of claim 1, wherein the wireless MIMO system is an N×N MIMO system.

7. The method of claim 1, wherein each forward composite channel estimate of the plurality of forward composite channel estimates represents a baseband/low IF symbol transfer function between a baseband processor of the first wireless MIMO device and a baseband processor of the second wireless MIMO device.

8. A method for operating a wireless MIMO system to determine forward and reverse channel reciprocity matrices relating a first wireless MIMO device and a second wireless MIMO device of the wireless MIMO system, the method comprising:
   during each of a plurality of time intervals, determining a forward composite channel estimates and a reverse composite channel estimates between the first wireless MIMO device and the second wireless MIMO device to yield a plurality of forward composite channel estimates and a plurality of reverse composite channel estimates, wherein each of the forward channel reciprocity matrix and the reverse channel reciprocity matrix are non-diagonal;
   creating a mathematical relationship between the plurality of forward composite channel estimates and the plurality of reverse composite channel estimates and the forward and reverse channel reciprocity matrices; and
   finding a solution to the mathematical relationship between the plurality of forward composite channel estimates and the plurality of reverse composite channel estimates to yield the forward channel reciprocity matrix and the reverse channel reciprocity matrix.

9. The method of claim 8, wherein a Kronecker product is used to find the solution to the mathematical relationship between the plurality of forward composite channel estimates and the plurality of reverse composite channel estimates to yield the forward channel reciprocity matrix and the reverse channel reciprocity matrix.

10. The method of claim 8, wherein a Singular Value Decomposition algorithm is used to find the solution to the mathematical relationship between the plurality of forward composite channel estimates and the plurality of reverse composite channel estimates to yield the forward channel reciprocity matrix and the reverse channel recipiocity matrix.

11. The method of claim 8, wherein each of the forward channel reciprocity matrix and the reverse channel reciprocity matrix are non-symmetrical.

12. The method of claim 8, wherein the wireless MIMO system is an N×M MIMO system, where M is not equal to N.

13. The method of claim 8, wherein the wireless MIMO system is an N×N MIMO system.

14. The method of claim 1, wherein each forward composite channel estimate of the plurality of forward composite channel estimates represents a baseband/low IF symbol transfer function between a baseband processor of the first wireless MIMO device and a baseband processor of the second wireless MIMO device.

15. A method for operating a wireless MIMO system to determine forward and reverse channel reciprocity matrices relating a first wireless MIMO device and a second wireless MIMO device of the wireless MIMO system, the method comprising:
   during each of a plurality of time intervals, determining a forward composite channel estimates and a reverse composite channel estimates between the first wireless MIMO device and the second wireless MIMO device to yield a plurality of forward composite channel estimates and a plurality of reverse composite channel estimates, the first wireless MIMO device and the second wireless MIMO device having differing antenna configurations;
   creating a mathematical relationship between the plurality of forward composite channel estimates and the plurality of reverse composite channel estimates and the forward and reverse channel reciprocity matrices; and
   finding a solution to the mathematical relationship between the plurality of forward composite channel estimates and the plurality of reverse composite channel estimates to yield the forward channel reciprocity matrix and the reverse channel reciprocity matrix, wherein the forward channel reciprocity matrix differs from the reverse channel reciprocity matrix.

16. The method of claim 15, wherein a Kronecker product is used to compute the forward channel reciprocity matrix and the reverse channel reciprocity matrix based upon the plurality of forward composite channel estimates and the plurality of reverse composite channel estimates.

17. The method of claim 15, wherein a Singular Value Decomposition algorithm is used to find the solution to the mathematical relationship between the plurality of forward composite channel estimates and the plurality of reverse composite channel estimates to yield the forward channel reciprocity matrix and the reverse channel reciprocity matrix.

18. The method of claim 15, wherein each of the forward channel reciprocity matrix and the reverse channel reciprocity matrix are non-diagonal.

19. The method of claim 15, wherein each of the forward channel reciprocity matrix and the reverse channel reciprocity matrix are non-symmetrical.

20. The method of claim 15, wherein the wireless MIMO system is an N×M MIMO system, where M is not equal to N.

* * * * *

UNITED STATES PATENT AND TRADEMARK OFFICE
CERTIFICATE OF CORRECTION

PATENT NO. : 7,242,961 B2 Page 1 of 1
APPLICATION NO. : 11/209003
DATED : July 10, 2007
INVENTOR(S) : Christopher Hansen It is certified that error appears in the above-identified patent and that said Letters Patent is hereby corrected as shown below:

Column 16, line 25, in Claim 10: replace "recipiocity" with --reciprocity--

Signed and Sealed this

Twelfth Day of August, 2008

JON W. DUDAS
*Director of the United States Patent and Trademark Office*